(12) United States Patent
Song

(10) Patent No.: US 9,244,873 B2
(45) Date of Patent: Jan. 26, 2016

(54) SEMICONDUCTOR DEVICE AND METHOD OF OPERATING THE SAME

(71) Applicant: SK hynix Inc., Gyeonggi-do (KR)

(72) Inventor: Choung-Ki Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 34 days.

(21) Appl. No.: 14/109,511

(22) Filed: Dec. 17, 2013

(65) Prior Publication Data

US 2015/0067201 A1    Mar. 5, 2015

(30) Foreign Application Priority Data

Sep. 2, 2013 (KR) .......................... 10-2013-0104764

(51) Int. Cl.
| | |
|---|---|
| *G06F 13/40* | (2006.01) |
| *G06F 3/06* | (2006.01) |
| *G06F 13/22* | (2006.01) |
| *G06F 13/38* | (2006.01) |

(52) U.S. Cl.
CPC .......... *G06F 13/4022* (2013.01); *G06F 3/0658* (2013.01); *G06F 3/0689* (2013.01); *G06F 13/22* (2013.01); *G06F 13/385* (2013.01)

(58) Field of Classification Search
CPC ... G06F 13/4022; G06F 13/22; G06F 3/0689; G06F 3/0658; G06F 13/385
See application file for complete search history.

(56) References Cited

U.S. PATENT DOCUMENTS

| | | | | | |
|---|---|---|---|---|---|
| 5,566,193 | A | * | 10/1996 | Cloonan | ....................... 714/802 |
| 7,606,342 | B1 | * | 10/2009 | Wiss et al. | .................... 375/371 |
| 2004/0131365 | A1 | * | 7/2004 | Lee et al. | ....................... 398/197 |
| 2007/0242508 | A1 | * | 10/2007 | Bae | .............................. 365/184 |

FOREIGN PATENT DOCUMENTS

KR    1020120098326    9/2012

* cited by examiner

*Primary Examiner* — Farley Abad
(74) *Attorney, Agent, or Firm* — IP & T Group LLP

(57) ABSTRACT

A semiconductor device includes a data storage suitable for storing a training data for a training operation, a data bus inversion (DBI) calculator suitable for calculating DBI information for the training data input from the data storage through global transmission lines, generating a DBI flag signal based on the DBI information and outputting a DBI data, which is the training data inverted according to the DBI flag signal, in response to a DBI signal, a first multiplexer suitable for selectively outputting the training data input from the data storage through the global transmission lines or the DBI data to a first channel in response to a training signal and the DBI signal and a second multiplexer suitable for selectively outputting the training data input from the data storage through the global transmission lines or the DBI flag signal to a second channel.

15 Claims, 7 Drawing Sheets

FIG. 6

SEMICONDUCTOR DEVICE AND METHOD OF OPERATING THE SAME

CROSS-REFERENCE TO RELATED APPLICATIONS

The present application claims priority of Korean Patent Application No. 10-2013-0104764, filed on Sep. 2, 2013, which is incorporated herein by reference in its entirety.

BACKGROUND

1. Field

Exemplary embodiments of the present invention relate to a semiconductor device, and more particularly, a semiconductor device for performing data bus inversion (DBI) operation and method of operating the same.

2. Description of the Related Art

A lot of signals are transferred between a semiconductor device and a controller for the semiconductor device through a path that is referred to as a channel. A channel transfers various types of signals. There may be a concern during transfer of the signals under circumstance of high speed operation of the semiconductor device. For example, the semiconductor device may consume large amount of current and there may be a high probability of error when a signal on the channel toggles between a low level and a high level a lot.

Data bus inversion (DBI) is nowadays introduced to overcome the problem. The DBI reduces a number of toggles or state transitions of the signals. According to the DBI, when a signal of 8-bit data is to be transferred, for example, it is checked a number of data shifting to a low level. All of the data is shifted to the low level when the number of data shifting to the low level exceeds 4. Accordingly, the DBI does not allow the number of data shifting from a high level to the low level to exceed 4 when a signal of 8-bit data is to be transferred.

FIG. 1 is a block diagram illustrating a conventional semiconductor device.

Referring to FIG. 1, the semiconductor device includes a command decoder 110, an address buffer 120, a multipurpose register 130, a core region 140, a DBI calculator 150 and a multiplexer 160.

The command decoder 110 decodes external command signals '/CS', '/RAS', '/CAS' and '/WE' and generates a multipurpose register (MPR) signal MPREN, a MPR read signal MPR_RD and MPR write signal MPR_WR for controlling the multipurpose register 130. The MPR signal MPREN is one for controlling enablement operation of the multipurpose register 130. The MPR write signal MPR_WR is one for controlling write operation of the multipurpose register 130. The MPR read signal MPR_RD is one for controlling read operation of the multipurpose register 130.

The address buffer 120 buffers and outputs a bank address signal BA[1:0] and an address signal A[7:0].

The multipurpose register 130 stores the data buffered and output by the address buffer 120 in response to the MPR write signal MPR_WR and outputs the stored data D[7:0] in response to the MPR read signal MPR_RD.

The core region 140 is connected to global transmission lines GIO[63:0] and receives and outputs data through the global transmission lines GIO[63:0].

The DBI calculator 150 in response to a DBI signal DBIEN calculates DBI information for data received through the global transmission lines GIO[63:0], generates a DBI flag signal DBI[7:0], reflects the DBI flag signal DBI[7:0] to data transferred through the global transmission lines GIO[63:0] and output the data, to which the DBI flag signal DBI[7:0] is reflected, with or without data inversion.

All of the data transferred through the global transmission lines GIO[63:0] during a normal operation may be input to the DBI calculator 150. Hereinafter, description is made with a part, for example, the global transmission lines GIO[7:0] of the global transmission lines GIO[63:0] as an example for clear description.

The DBI calculator 150 includes a DBI flag generation unit 151 and a data inversion unit 152. The DBI flag generation unit 151 in response to the DBI signal DBIEN calculates the DBI information for data D[7:0] received through the global transmission lines GIO[7:0] of the global transmission lines GIO[63:0] and generates the DBI flag signal DBI[7:0]. The data inversion unit 152 outputs the data D[7:0] transferred through the global transmission lines GIO[7:0] of the global transmission lines GIO[63:0] with or without data inversion according to the DBI flag signal DBI[7:0]. The DBI flag signal DBI[7:0] is output from the DBI flag generation unit 151 through a second channel CH_OUT2.

The multiplexer 160 selectively outputs data from the global transmission lines GIO[63:0] or data from the data inversion unit 152 through a first channel CH_OUT1 according to the DBI signal DBIEN.

Detailed description of an operation of the semiconductor device is set forth here below.

FIG. 2 is a timing diagram illustrating write operation of the multipurpose register of the conventional semiconductor device.

Referring to FIG. 2, the MPR signal MPREN is enabled when a mode register setting (MRS) mode is selected in response to the command signal CMD such as '/CS', '/RAS', '/CAS', '/WE' and so forth. The multipurpose register 130 performs write operation during MPR write mode WR that is subsequently selected.

When the MPR write mode WR is selected and the bank address signal BA[1:0] is input, the multipurpose register 130 stores the address signal A[7:0] at a location therein that is selected through the bank address signal BA[1:0]. The multipurpose register 130 comprises a first to fourth registers MPR_LAT1, MPR_LAT2, MPR_LAT3 and MPR_LAT4. The first to fourth register MPR_LAT1 to MPR_LAT4 are selected according to the bank address signal BA[1:0] and, for example, data "F0" is stored into the first register MPR_LAT1, data "0F" is stored into the second register MPR_LAT2, data "00" is stored into the third register MPR_LAT3 and data "FF" is stored into the fourth register MPR_LAT4 according to the address signal A[7:0].

FIG. 3 is a timing diagram illustrating read operation of the multipurpose register without the DBI.

Referring to FIG. 3, the MPR signal MPREN is enabled when the MRS mode is selected in response to the command signal CMD. The multipurpose register 130 performs read operation during MPR read mode RD that is subsequently selected.

When the MPR read mode RD is selected, data D[7:0] stored in the first to fourth register MPR_LAT1 to MPR_LAT4 are output to the first channel CH_OUT1 through the global transmission lines GIO[7:0] of the global transmission lines GIO[63:0].

FIG. 4 is a timing diagram illustrating read operation of the multipurpose register with the DBI.

Referring to FIG. 4, data to be output to the first channel CH_OUT1 is inverted according to the DBI when the majority of the data has the low level.

Training operation between the semiconductor device and the controller becomes one of major concerns as data transmission speed between the semiconductor device and the controller gets higher nowadays.

Referring back to FIG. 3 illustrating conventional operation without the DBI, it is possible to perform the data training operation to the first channel CH_OUT1 but impossible to perform the data training operation to the second channel CH_OUT2 due to absence of the DBI.

Referring back to FIG. 4 illustrating operation with the DBI, it is possible to perform the data training operation to the second channel CH_OUT2 but impossible to perform the data training operation to the first channel CH_OUT1 because all of data output from the first channel CH_OUT1 have the high level by DBI information of the DBI operation.

In short, in the conventional semiconductor device, it is possible to perform the data training operation to the first channel CH_OUT1 but impossible to perform the data training operation to the second channel CH_OUT2 due to absence of the DBI. On the other hand, it is possible to perform the data training operation to the second channel CH_OUT2 but impossible to perform the data training operation to the first channel CH_OUT1 due to presence of the DBI.

SUMMARY

Various embodiments are directed to a semiconductor device capable of performing data training operation to a channel during the DBI operation, to a test system capable of data communication with a semiconductor device through a channel and capable of performing data test through the data training operation and to a method of operating the same.

In an embodiment, a semiconductor device may include a data storage suitable for storing a training data for a training operation, a data bus inversion (DBI) calculator suitable for calculating DBI information for the training data input from the data storage through global transmission lines, generating a DBI flag signal based on the DBI information and outputting a DBI data, which is the training data inverted according to the DBI flag signal, in response to a DBI signal, a first multiplexer suitable for selectively outputting the training data input from the data storage through the global transmission lines or the DBI data to a first channel in response to the training signal and the DBI signal and a second multiplexer suitable for selectively outputting the training data input from the data storage through the global transmission lines or the DBI flag signal to a second channel.

In an embodiment, a method of operating a semiconductor device may include calculating a data bus inversion (DBI) information for a normal data, generating a normal DBI flag signal based on the DBI information for the normal data and outputting a DBI data, which is the normal data inverted according to the DBI flag signal, to a first channel and the normal DBI flag signal to a second channel during a normal operation and calculating a DBI information for a training data, generating a training DBI flag signal based on the DBI information for the training data and outputting the training data to the first channel and the training DBI flag signal or the training data to the second channel during a training operation.

In an embodiment, a semiconductor device may include a multipurpose register suitable for storing a training data for a training operation that is input through an address signal, a data bus inversion (DBI) calculator suitable for calculating DBI information for the training data input from the multipurpose register through global transmission lines, generating a DBI flag signal based on the DBI information for the training data and outputting a DBI data, which is the training data inverted according to the DBI flag signal, in response to a DBI signal, a first multiplexer suitable for selectively outputting the training data input from the multipurpose register through global transmission lines or the DBI data to a first channel in response to the MPR signal and the DBI signal and a second multiplexer suitable for selectively outputting the training data input from the multipurpose register through global transmission lines or the DBI flag data to a second channel.

In an embodiment, a test system may include a semiconductor device suitable for calculating data bus inversion (DBI) information for a test data and generate a test DBI flag signal based on the DBI information for the test data, outputting the test data to a first channel and outputting the test DBI flag signal or the test data to a second channel and a test device suitable for comparing data output through the first channel with data output through the second channel and detect a defect of the first channel and the second channel.

In accordance with the above embodiments, it is possible to provide optimal data transmission circumstance through data training operation and to increase reliability of a semiconductor device through detection of a defect of data path.

DETAILED DESCRIPTION

Figure 1:
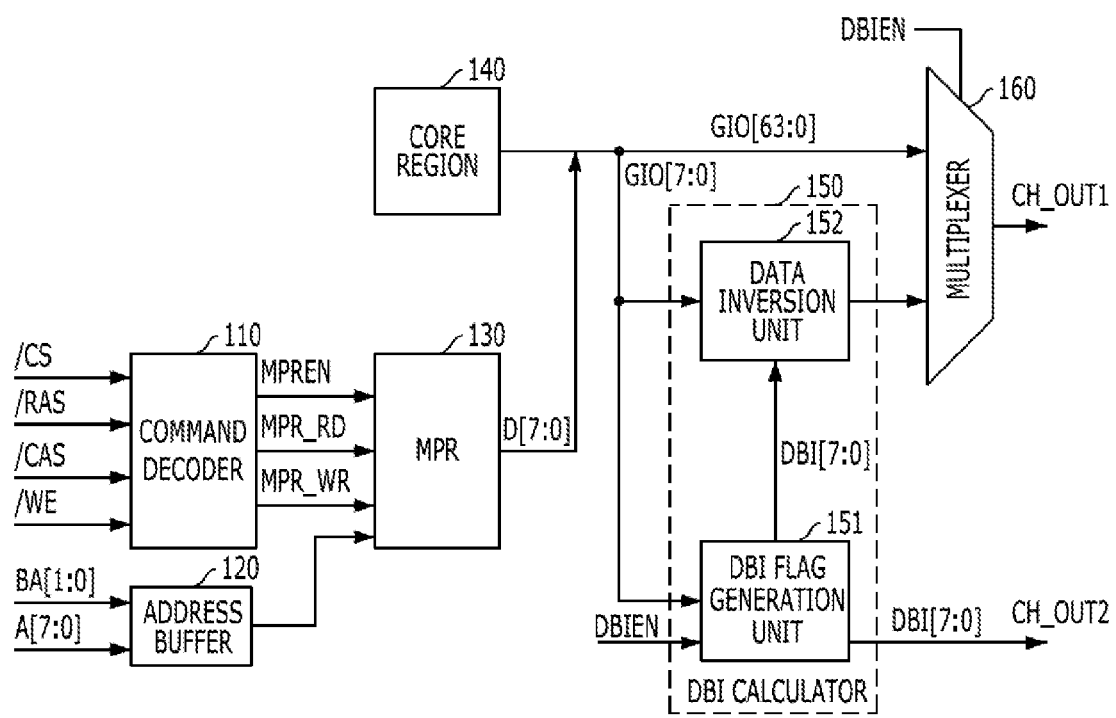
FIG. 1 is a block diagram illustrating a conventional semiconductor device.
Figure 2:
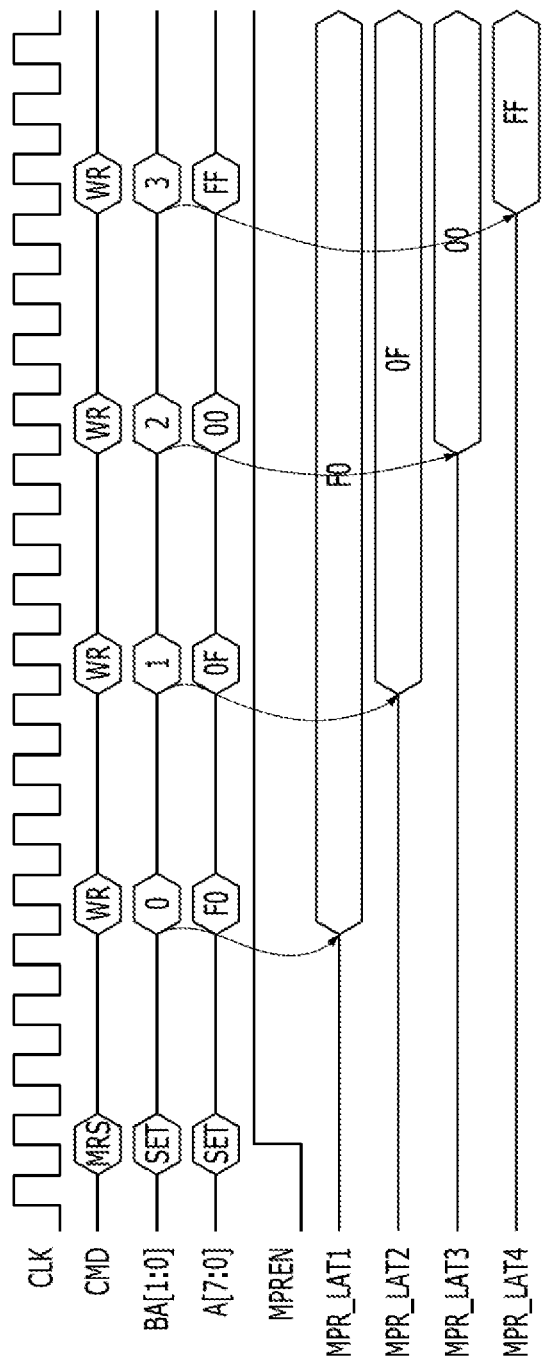
FIG. 2 is a timing diagram illustrating write operation of a multipurpose register of a conventional semiconductor device.
Figure 3:
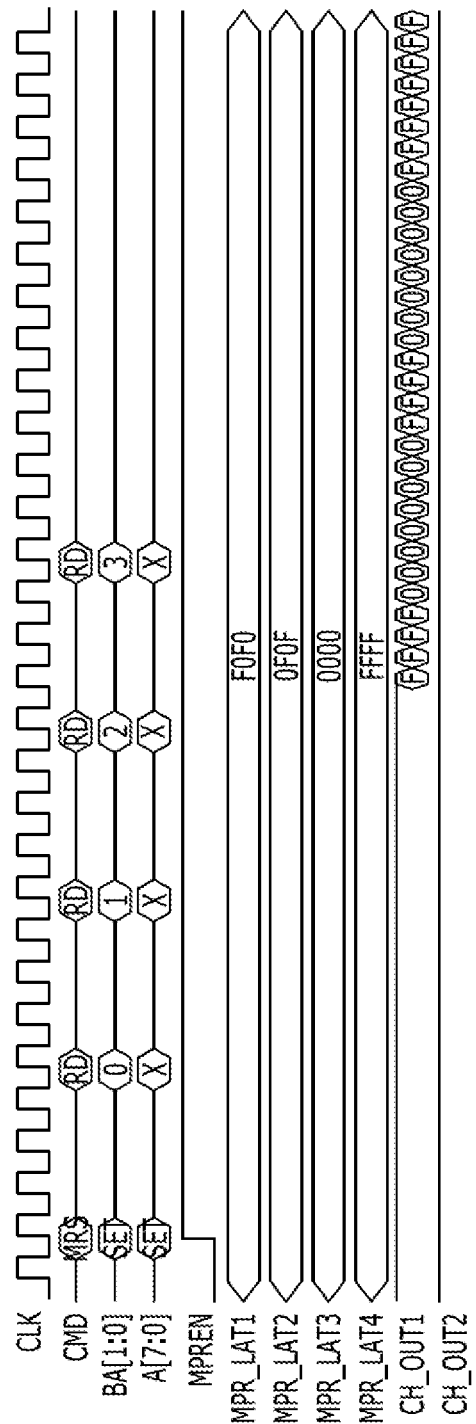
FIG. 3 is a timing diagram illustrating read operation of a multipurpose register without a DBI.
Figure 4:
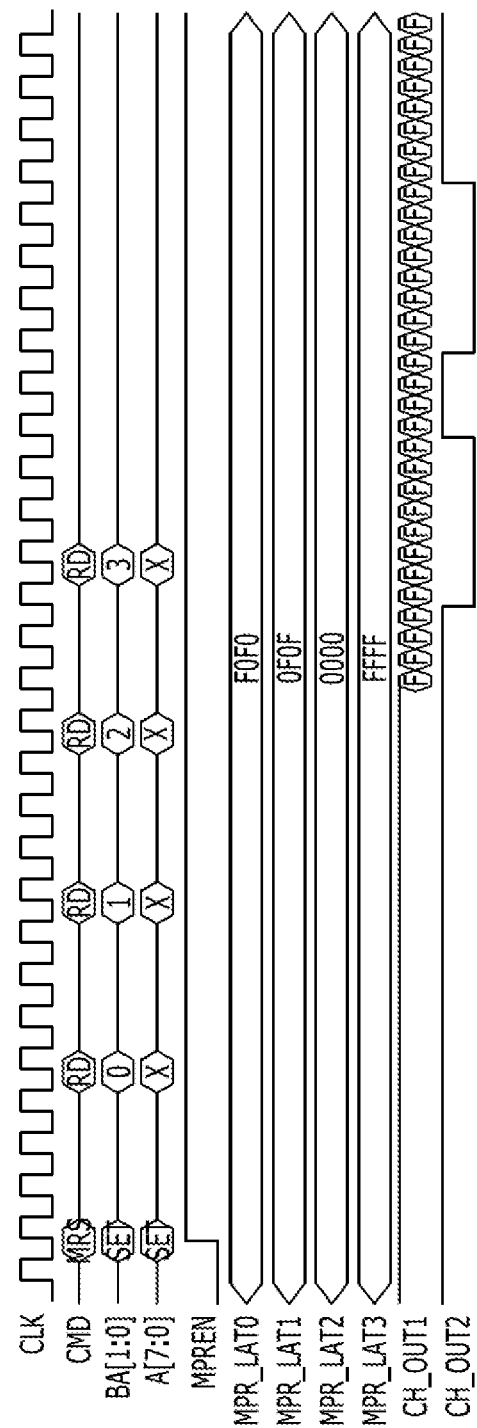
FIG. 4 is a timing diagram illustrating read operation of a multipurpose register with a DBI.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. Throughout the disclosure, like reference numerals refer to like parts throughout the various figures and embodiments of the present invention.

Figure 5:
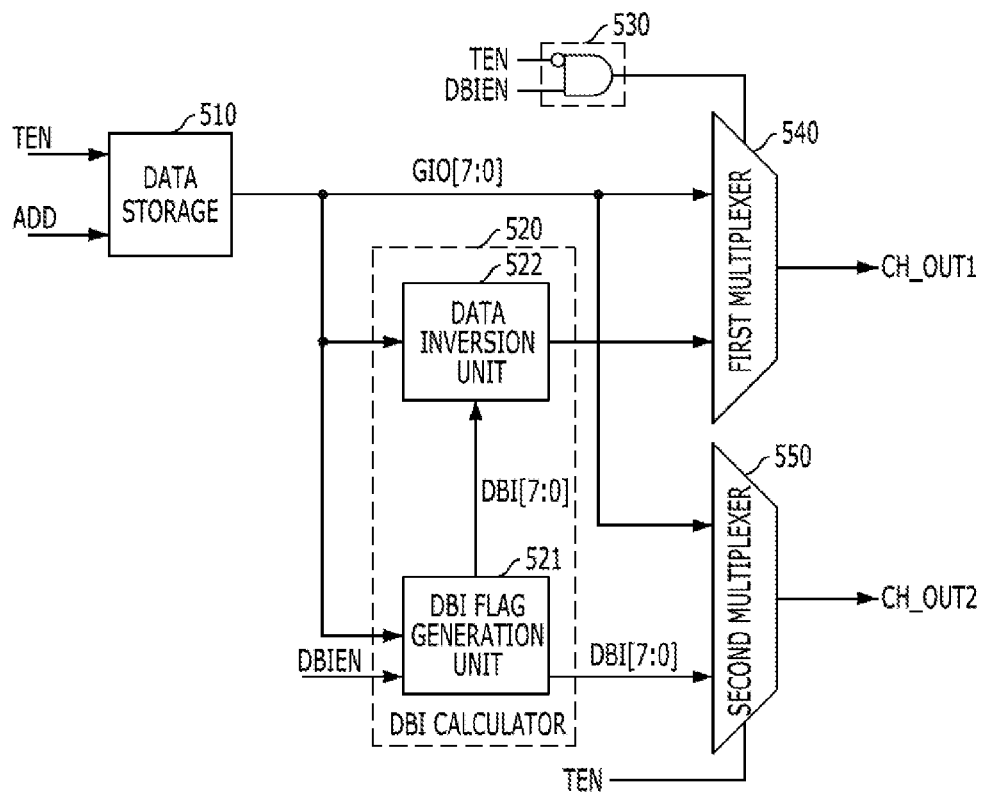
FIG. 5 is a block diagram illustrating a semiconductor device in accordance with an embodiment of the present invention.

FIG. 5 is a block diagram illustrating a semiconductor device in accordance with an embodiment of the present invention.

Referring to FIG. 5, the semiconductor device may include a data storage 510, a DBI calculator 520, a control signal generator 530, a first multiplexer 540 and a second multiplexer 550.

The data storage 510 may store a training data for a training operation and transmit the training data to a global transmission lines GIO[7:0] in response to a training signal TEN. The training data may represent an address signal ADD input together with the training signal TEN and may be used for a test training operation to a channel.

The DBI calculator 520 in response to a DBI signal DBIEN may calculate DBI information for data received through the global transmission lines GIO[7:0], generate a DBI flag signal DBI[7:0], reflect the DBI flag signal DBI[7:0] to data transferred through the global transmission lines GIO[7:0] and output the data, to which the DBI flag signal DBI[7:0] is reflected, with or without data inversion.

The DBI calculator 520 includes a DBI flag generation unit 521 and a data inversion unit 522.

The DBI flag generation unit 521 in response to the DBI signal DBIEN, which is generated during the DBI, may calculate the DBI information for the training data input from the data storage 510 through the global transmission lines GIO[7:0] and generate the DBI flag signal DBI[7:0]. For example, the DBI flag signal DBI[7:0] may be generated with a value indicating the low level when a number of data having the low level exceeds 4 according to each burst length BL of the training data GIO[7:0].

According to the embodiment of the present invention, the semiconductor device may perform training operation to a first and second channel CH_OUT1 and CH_OUT2 of the semiconductor device shown in FIG. 5. In the embodiment of the present invention shown in FIG. 5, the data transferred through the global transmission lines GIO[7:0] may be output through the second channel CH_OUT2 as well as the data output from the DBI flag generation unit 521.

The data inversion unit 522 may output the training data transferred from the data storage 510 through the global transmission lines GIO[7:0] with or without data inversion according to the DBI flag signal DBI[7:0] output from the DBI flag generation unit 521.

The control signal generator 530 may generate a control signal for the first multiplexer 540 in response to the training signal TEN and the DBI signal DBIEN. The control signal generator 530 may comprise AND gate for receiving the inverted training signal TEN and the DBI signal DBIEN.

The first multiplexer 540 in response to the control signal generated by the control signal generator 530 may selectively output, to the first channel CH_OUT1, the training data output from the data storage 510 through the global transmission lines GIO[7:0] or the data output from the data inversion unit 522.

The second multiplexer 550 in response to the training signal TEN may selectively output, to the second channel CH_OUT2, the training data output from the data storage 510 through the global transmission lines GIO[7:0] or the DBI flag signal DBI[7:0] output from the DBI flag generation unit 521.

The first channel CH_OUT1 may be connected to a DQ pad and the second channel CH_OUT2 may be connected to a DPI pad.

An operation of the semiconductor device in accordance with the embodiment of the present invention is described here below.

During the normal operation and in the DBI mode, the data storage 510 may store and the training data input through the address signal ADD and output the training data to the global transmission lines GIO[7:0]. The training data transferred from the data storage 510 through the global transmission lines GIO[7:0] may be output to the first channel CH_OUT1 through the first multiplexer 540. The second multiplexer 550 may output the DBI flag signal DBI[7:0] generated by the DBI calculator 520 to the second channel CH_OUT2.

During the training operation but not in the DBI mode, the data storage 510 may store the training data input through the address signal ADD and output the training data to the global transmission lines GIO[7:0]. The training data transferred from the data storage 510 through the global transmission lines GIO[7:0] may be output to the first channel CH_OUT1 through the first multiplexer 540. The second multiplexer 550 may also output the training data transferred from the data storage 510 through the global transmission lines GIO[7:0] to the second channel CH_OUT2.

With the operation described above, the same data or the training data may be output to both of the first channel CH_OUT1 and the second channel CH_OUT2 and it is possible to perform the training operation to both of the first channel CH_OUT1 and the second channel CH_OUT2 during the training operation in a mode other than the DBI mode.

During the training operation and in the DBI mode, the DBI flag generation unit 521 of the DBI calculator 520 in response to the DBI signal DBIEN may calculate the DBI information for the training data input from the data storage 510 through the global transmission lines GIO[7:0] and generate the DBI flag signal DBI[7:0], which may be input to the data inversion unit 522.

The data inversion unit 522 may output the training data transferred from the data storage 510 through the global transmission lines GIO[7:0] with or without data inversion according to the DBI flag signal DBI[7:0].

The first multiplexer 540 may output the training data input from the data storage 510 through the global transmission lines GIO[7:0] to the first channel CH_OUT1 according to the enabled training signal TEN and the enabled DBI signal DBIEN. The second multiplexer 550 may output the training data input from the data storage 510 through the global transmission lines GIO[7:0] to the second channel CH_OUT2 according to the enabled training signal TEN.

With the operation described above, the same data or the test may be output to both of the first channel CH_OUT1 and the second channel CH_OUT2 and it is possible to perform the training operation to both of the first channel CH_OUT1 and the second channel CH_OUT2 during the training operation and in the DBI mode.

The semiconductor device in accordance with the embodiment of the present invention may output the training data stored in the data storage 510 to both of the first channel CH_OUT1 and the second channel CH_OUT2 at the same time in the DBI mode. It is possible to perform the training operation to both of the first channel CH_OUT1 and the second channel CH_OUT2 through application of the training data stored in the data storage 510 to the second channel CH_OUT2 for the training operation.

Even though not illustrated in FIG. 5, the first multiplexer 540 and the second multiplexer 550 may output parallel data that may be transformed into serial data by a serialization circuit.

Figure 6:
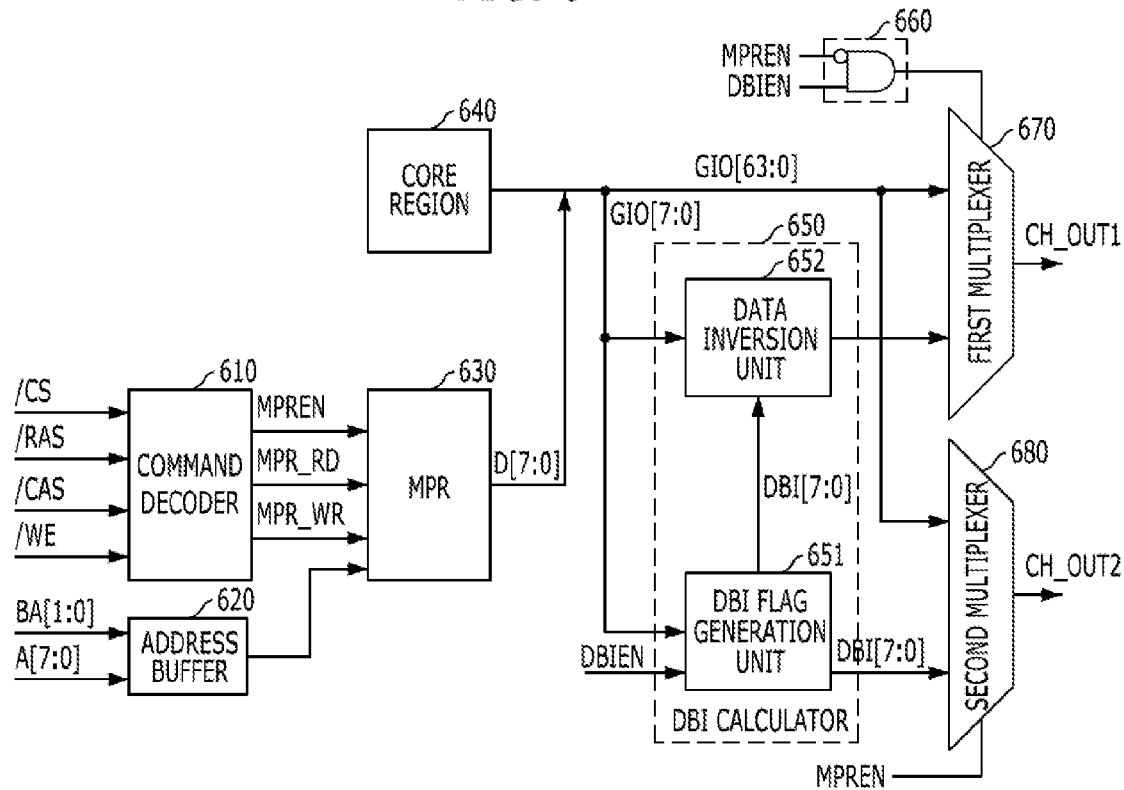
FIG. 6 is a block diagram illustrating a semiconductor device in accordance with another embodiment of the present invention.

FIG. 6 is a block diagram illustrating a semiconductor device in accordance with another embodiment of the present invention.

Referring to FIG. 6, the semiconductor device may include a command decoder 610, an address buffer 620, a multipurpose register 630, a core region 640, a DBI calculator 650, a control signal generator 660, a first multiplexer 670 and a second multiplexer 680.

The semiconductor device in accordance with the embodiment of the present invention may output the training data D[7:0] stored in the multipurpose register 630, which corresponds to the data storage 510 shown in FIG. 5, to both of the first channel CH_OUT1 and the second channel CH_OUT2. It is possible to perform the training operation to both of the first channel CH_OUT1 and the second channel CH_OUT2 through application of the training data D[7:0] stored in the multipurpose register 630 to the second channel CH_OUT2 for the training operation.

The command decoder 610 may decode external command signals '/CS', '/RAS', '/CAS' and '/WE' and generate a MPR signal MPREN, a MPR read signal MPR_RD and MPR write signal MPR_WR for controlling the multipurpose register 630. The MPR signal MPREN may be one for controlling enablement operation of the multipurpose register 630. The MPR write signal MPR_WR may be one for controlling write operation of the multipurpose register 630. The MPR read signal MPR_RD may be one for controlling read operation of the multipurpose register 630.

The address buffer 620 may buffer and output a bank address signal BA[1:0] and an address signal A[7:0].

The multipurpose register 630 may store the data buffered and output by the address buffer 620 in response to the MPR write signal MPR_WR and output the stored data D[7:0] in response to the MPR read signal MPR_RD.

The MPR signal MPREN may be used for controlling a mode register set as well as the multipurpose register 630.

The core region 640 may be connected to global transmission lines GIO[63:0] and receive and output data through the global transmission lines GIO[63:0].

The DBI calculator 650 in response to the DBI signal DBIEN may calculate DBI information for data received through the global transmission lines GIO[7:0] of the global transmission lines GIO[63:0], generate the DBI flag signal DBI[7:0], reflect the DBI flag signal DBI[7:0] to data transferred through the global transmission lines GIO[63:0] and output the data, to which the DBI flag signal DBI[7:0] is reflected, with or without data inversion.

All of the data transferred through the global transmission lines GIO[63:0] during the normal operation may be input to the DBI calculator 650. Hereinafter, description is made with a part, for example, the global transmission lines GIO[7:0] of the global transmission lines GIO[63:0] as an example for clear description.

The DBI calculator 650 includes a DBI flag generation unit 651 and a data inversion unit 652.

The DBI flag generation unit 651 in response to the DBI signal DBIEN, which is generated during the DBI, may calculate the DBI information for the test data input from the multipurpose register 630 through the global transmission lines GIO[7:0] and generate the DBI flag signal DBI[7:0]. The training data through the global transmission lines GIO[7:0] may be the data D[7:0] output from the multipurpose register 630 through MPR operation.

The data inversion unit 652 may output the training data transferred from the multipurpose register 630 through the global transmission lines GIO[7:0] of the global transmission lines GIO[63:0] with or without data inversion according to the DBI flag signal DBI[7:0] output from the DBI flag generation unit 651.

The control signal generator 660 may generate a control signal for the first multiplexer 670 in response to the training signal TEN and the DBI signal DBIEN. The control signal generator 660 may comprise AND gate for receiving the inverted training signal TEN and the DBI signal DBIEN.

The first multiplexer 670 in response to the control signal generated by the control signal generator 660 may selectively output, to the first channel CH_OUT1, the training data output from the multipurpose register 630 through the global transmission lines GIO[7:0] of the global transmission lines GIO[63:0] or the DBI data output from the data inversion unit 652.

The second multiplexer 680 in response to the MPR signal MPREN may selectively output, to the second channel CH_OUT2, the training data output from the multipurpose register 630 through the global transmission lines GIO[7:0] of the global transmission lines GIO[63:0] or the DBI flag signal DBI[7:0] output from the DBI flag generation unit 651.

An operation of the semiconductor device in accordance with the embodiment of the present invention is described here below.

During the normal operation and in the DBI mode, the DBI flag generation unit 651 of the DBI calculator 650 in response to the DBI signal DBIEN may calculate the DBI information for the data input from the core region 640 through the global transmission lines GIO[7:0] of the global transmission lines GIO[63:0] and generate the DBI flag signal DBI[7:0], which may be input to the data inversion unit 652. The data inversion unit 652 may output the data transferred from the core region 640 through the global transmission lines GIO[7:0] of the global transmission lines GIO[63:0] with or without data inversion according to the DBI flag signal DBI[7:0].

The first multiplexer 670 may output the data transferred from the core region 640 through the global transmission lines GIO[7:0] of the global transmission lines GIO[63:0] to the first channel CH_OUT1. The second multiplexer 680 may output the DBI flag signal DBI[7:0] output from the DBI calculator 650.

During the training operation but not in the DBI mode, the multipurpose register 630 may store the address signal A[7:0], which is buffered by the address buffer 620, as the training data D[7:0] in response to the MPR signal MPREN, the MPR read signal MPR_RD and the MPR write signal MPR_WR, which are generated by the command decoder 610, and output the training data D[7:0] to the global transmission lines GIO[63:0].

The training data D[7:0] transferred from the multipurpose register 630 through the global transmission lines GIO[63:0] may be output to the first channel CH_OUT1 by the first multiplexer 670. The second multiplexer 680 may selectively output the training data transferred from the multipurpose register 630 through the global transmission lines GIO[7:0] of the global transmission lines GIO[63:0] to the second channel CH_OUT2 in response to the MPR signal MPREN.

With the operation described above, the same data or the training data may be output to both of the first channel CH_OUT1 and the second channel CH_OUT2 and it is possible to perform the training operation to both of the first channel CH_OUT1 and the second channel CH_OUT2 during the training operation in a mode other than the DBI mode.

During the training operation and in the DBI mode, the DBI flag generation unit 651 of the DBI calculator 650 in response to the DBI signal DBIEN may calculate the DBI information for the training data input from the multipurpose register 630 through the global transmission lines GIO[7:0] of the global transmission lines GIO[63:0] and generate the DBI flag signal DBI[7:0], which may be input to the data inversion unit 652.

The data inversion unit 652 may output the data transferred from the multipurpose register 630 through the global transmission lines GIO[7:0] of the global transmission lines GIO[63:0] with or without data inversion according to the DBI flag signal DBI[7:0].

The first multiplexer 670 in response to the control signal generated by the control signal generator 660 may selectively output the data transferred from the multipurpose register 630 through the global transmission lines GIO[7:0] of the global transmission lines GIO[63:0] or the data output from the data inversion unit 652. The first multiplexer 670 may output to the first channel CH_OUT1 the training data transferred from the multipurpose register 630 through the global transmission lines GIO[7:0] of the global transmission lines GIO[63:0] according to the enabled MPR signal MPREN and the enabled DBI signal DBIEN. The second multiplexer 680 may output, to the second channel CH_OUT2, the training data transferred from the multipurpose register 630 through the global transmission lines GIO[7:0] of the global transmission lines GIO[63:0] according to the MPR signal MPREN.

With the operation described above, the same data or the test may be output to both of the first channel CH_OUT1 and the second channel CH_OUT2 and it is possible to perform the training operation to both of the first channel CH_OUT1 and the second channel CH_OUT2 during the training operation and in the DBI mode.

As described above, the semiconductor device in accordance with the embodiment of the present invention may output the training data D[7:0] stored in the multipurpose register 630 to both of the first channel CH_OUT1 and the second channel CH_OUT2 at the same time. It is possible to perform the training operation to both of the first channel CH_OUT1 and the second channel CH_OUT2 through application of the training data D[7:0] stored in the multipurpose register 630 to the second channel CH_OUT2 for the training operation.

Even though not illustrated in FIG. 6, the first multiplexer 670 and the second multiplexer 680 may output parallel data that may be transformed into serial data by a serialization circuit.

Figure 7:
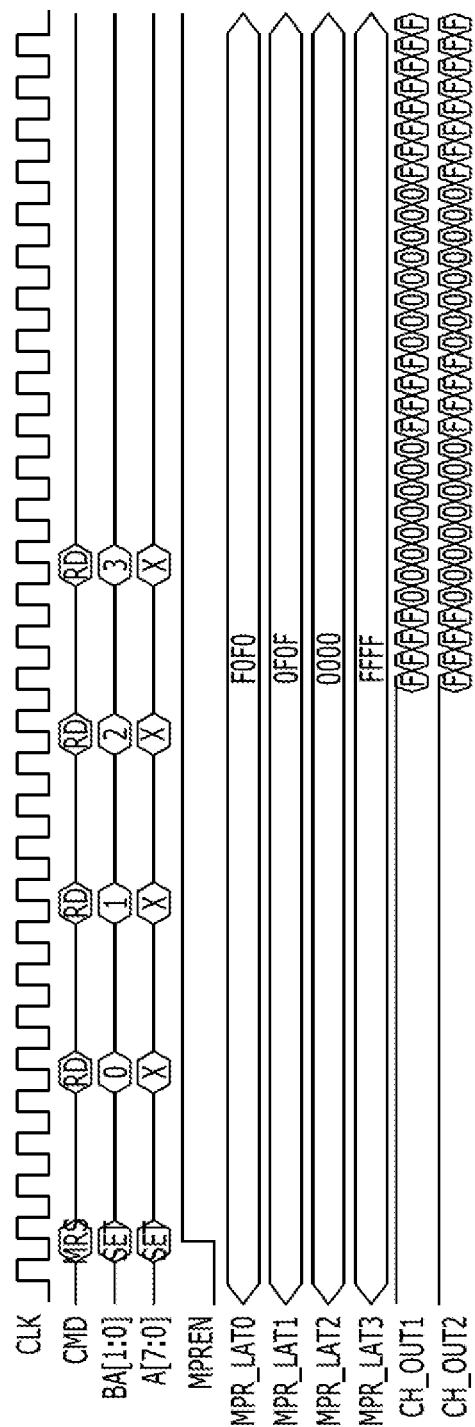
FIG. 7 is a timing diagram illustrating read operation of a multipurpose register during training operation in a DBI mode of the semiconductor device illustrated in FIG. 6.

FIG. 7 is a timing diagram illustrating read operation of a multipurpose register during the training operation in the DBI mode of the semiconductor device illustrated in FIG. 6.

Referring to FIG. 7, the MPR signal MPREN is enabled when the MRS mode is selected in response to the command signal CMD. The multipurpose register 630 performs read operation during MPR read mode RD that is subsequently selected. Whenever the MPR read mode RD is enabled, the data "F0", "0F", "00" and "FF" respectively stored in a first to fourth register MPR_LAT1 to MPR_LAT4 of the multipurpose register 630 may be output according to the bank address signal BA[1:0]. The output data "F0", "0F", "00" and "FF" are originally parallel and transformed into the serial data by a serialization circuit.

The data output through the data inversion unit 652 or the data stored in the multipurpose register 630 other than the DBI flag signal DBI[7:0] may be output through both of the first channel CH_OUT1 and the second channel CH_OUT2 and thus it is possible to perform the data training operation to both of the first channel CH_OUT1 and the second channel CH_OUT2 at the same time.

Figure 8:
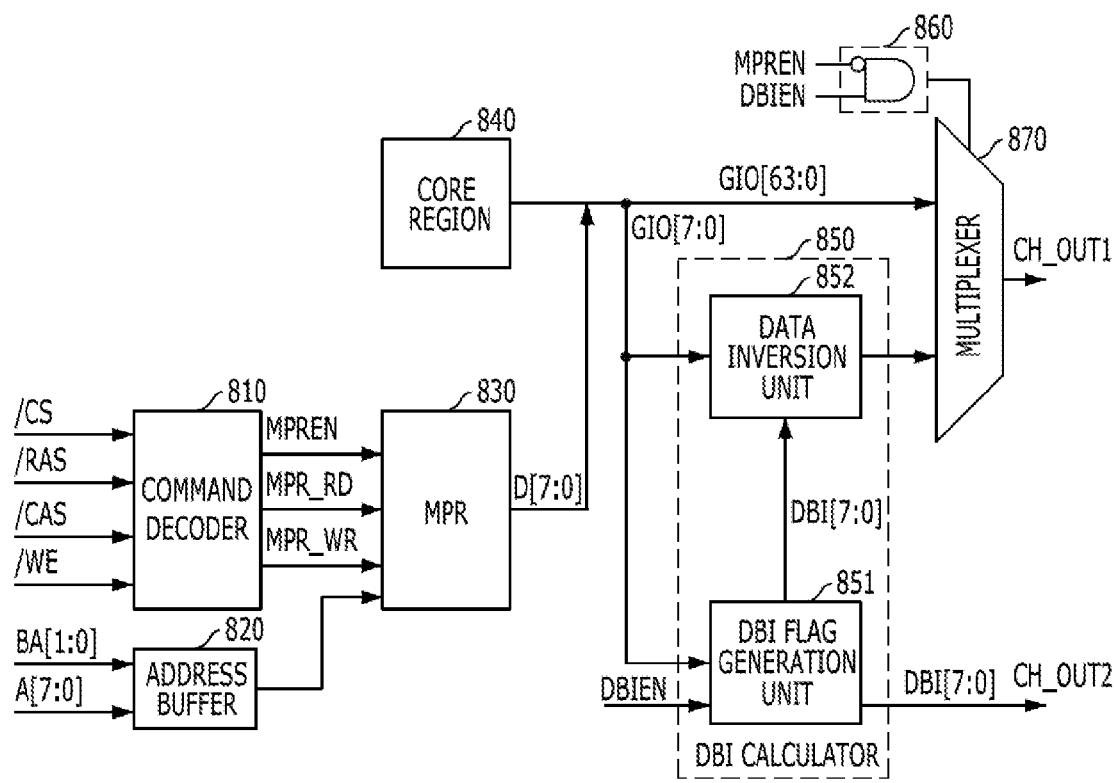
FIG. 8 is a block diagram illustrating a semiconductor device in accordance with another embodiment of the present invention.

FIG. 8 is a block diagram illustrating a semiconductor device in accordance with another embodiment of the present invention.

Referring to FIG. 8, the semiconductor device may include a command decoder 810, an address buffer 820, a multipurpose register 830, a core region 840, a DBI calculator 850, a control signal generator 860 and a multiplexer 870.

The command decoder 810, the address buffer 820, the multipurpose register 830, the core region 840, the DBI calculator 850 and the control signal generator 860 in the embodiment illustrated in FIG. 8 may be the same as the command decoder 610, the address buffer 620, the multipurpose register 630, the core region 640, the DBI calculator 650 and the control signal generator 660 in the embodiment illustrated in FIG. 6.

The multiplexer 870, which is similar to the first multiplexer 670 shown in FIG. 6, may selectively output, to the first channel CH_OUT1, the training data transferred from the multipurpose register 830 through the global transmission lines GIO[7:0] of the global transmission lines GIO[63:0] or the DBI data output from the data inversion unit 852.

The DBI flag signal DBI[7:0] output from the DBI flag generation unit 851 may be output to the second channel CH_OUT2.

With the operation described above, the training data D[7:0] transferred from the multipurpose register 830 through the global transmission lines GIO[7:0] of the global transmission lines GIO[63:0] may be output to the first channel CH_OUT1 by the first multiplexer 870. The DBI flag signal DBI[7:0] may be output to the second channel CH_OUT2 by the DBI flag generation unit 851. The training data D[7:0] stored in the multipurpose register 830 and the DBI flag signal DBI[7:0] according to the DBI information representing the training data D[7:0] may be output to the first channel CH_OUT1 and the second channel CH_OUT2 and thus it is possible to perform the training operation to both of the first channel CH_OUT1 and the second channel CH_OUT2.

Figure 9:
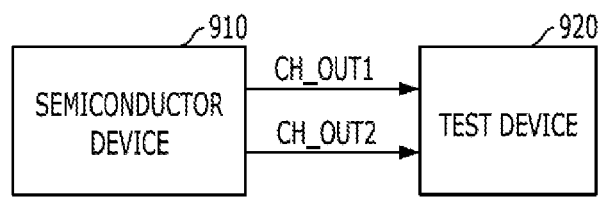
FIG. 9 is a block diagram illustrating a test system in accordance with an embodiment of the present invention.

FIG. 9 is a block diagram illustrating a test system in accordance with an embodiment of the present invention.

Referring to FIG. 9, the test system may include a semiconductor device 910 and a test device 920.

The semiconductor device 910 during the training operation may calculate DBI information for the training data and generate a test DBI flag signal. The training data may be used as a test data for testing the first channel CH_OUT1 and the second channel CH_OUT2 in the test system in accordance with the embodiment of the present invention. The test data may be output to the first channel CH_OUT1. The test data or the DBI flag signal may be output to the second channel CH_OUT2. Detailed structure and operation of the semiconductor device 910 may be the same as those described with reference to FIGS. 5 to 8.

The test device 920 may compare data input through the first channel CH_OUT1 with data input through the second channel CH_OUT2, both of the data being from the semiconductor device 910, and detect a defect of a first data path and a second data path respectively including the first channel CH_OUT1 and the second channel CH_OUT2.

The first data path and the second data path are described below with reference to FIG. 8.

The first data path may be a path where the training data D[7:0] or the test data output from the multipurpose register 830 is transferred through the global transmission lines GIO[63:0] and output to the first channel CH_OUT1.

The second data path may be a path where the training data D[7:0] or the test data output from the multipurpose register 830 is transferred to the DBI calculator 850 through the global transmission lines GIO[7:0] of the global transmission lines GIO[63:0] and the DBI flag signal DBI[7:0] generated by the DBI flag generation unit 851 is output to the second channel CH_OUT2.

The semiconductor device 910 may output the training data or the test data and the DBI flag signal DBI[7:0], which corresponds to the training data or the test data, to the first channel CH_OUT1 and the second channel CH_OUT2, respectively.

The test device 920 in a first test mode may compare the test data input through the first channel CH_OUT1 with the test data input through the second channel CH_OUT2, both of the test data being from the semiconductor device 910, and detect a defect of the first data path and the second data path respectively including the first channel CH_OUT1 and the second channel CH_OUT2.

The test device 920 in a second test mode may receive the test data input through the first channel CH_OUT1 with the DBI flag signal DBI[7:0] input through the second channel CH_OUT2, both of the data being from the semiconductor device 910, compare the first data path and the second data path and detect operation of the DBI calculator 850 based on existence of defect on the second data path.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a data storage suitable for storing a training data for a training operation;
   a data bus inversion (DBI) calculator suitable for calculating DBI information for the training data input from the data storage through global transmission lines, generating a DBI flag signal based on the DBI information and outputting a DBI data, which is the training data inverted according to the DBI flag signal, in response to a DBI signal;
   a first multiplexer suitable for selectively outputting the training data input from the data storage through the global transmission lines or the DBI data to a first channel in response to a training signal and the DBI signal; and
   a second multiplexer suitable for selecting between outputting the training data input from the data storage through the global transmission lines and the DBI flag signal to a second channel in response to the training signal.

2. The semiconductor device of claim 1, further comprising a control signal generator suitable for generating a control signal for the first multiplexer.

3. The semiconductor device of claim 1, wherein the first multiplexer and the second multiplexer output parallel data that are respectively transformed into serial data by a serialization circuit.

4. A method of operating a semiconductor device comprising: calculating a data bus inversion (DBI) information for a normal data, generating a normal DBI flag signal based on the DBI information for the normal data and outputting a DBI data, which is the normal data inverted according to the DBI flag signal, to a first channel and the normal DBI flag signal to a second channel during a normal operation; and
   calculating a DBI information for a training data, generating a training DBI flag signal based on the DBI information for the training data and outputting the training data to the first channel and selecting between outputting the training DBI flag signal and the training data to the second channel during a training operation in response to a training signal.

5. The method of claim 4, wherein the training data are stored in a multipurpose register through an address signal.

6. A semiconductor device comprising:
   a multipurpose register suitable for storing a training data for a training operation that is input through an address signal;
   a data bus inversion (DBI) calculator suitable for calculating DBI information for the training data input from the multipurpose register through global transmission lines, generating a DBI flag signal based on the DBI information for the training data and outputting a DBI data, which is the training data inverted according to the DBI flag signal, in response to a DBI signal;
   a first multiplexer suitable for selectively outputting the training data input from the multipurpose register through global transmission lines or the DBI data to a first channel in response to the MPR signal and the DBI signal; and
   a second multiplexer suitable for selecting between outputting the training data input from the multipurpose register through global transmission lines and the DBI flag data to a second channel in response to a training signal.

7. The semiconductor device of claim 6, further comprising a core region suitable for storing a normal data during a normal operation,
   wherein the core region during the normal operation outputs the normal data through the global transmission lines.

8. The semiconductor device of claim 6, further comprising a command decoder suitable for decoding external command signals and generating a multipurpose register (MPR) signal, a MPR write signal and a MPR read signal.

9. The semiconductor device of claim 6, further comprising a control signal generator suitable for generating a control signal for the first multiplexer.

10. The semiconductor device of claim 6, further comprising an address buffer suitable for buffering a bank address and an address and generating the address signal input to the multipurpose register.

11. The semiconductor device of claim 6, wherein the first multiplexer and the second multiplexer output parallel data that are respectively transformed into serial data by a serialization circuit.

12. A test system comprising:
    a semiconductor device suitable for calculating data bus inversion (DBI) information for a test data and generate a test DBI flag signal based on the DBI information for the test data, outputting the test data to a first channel and selecting between outputting the test DBI flag signal and the test data to a second channel in response to a training signal; and
    a test device suitable for comparing data output through the first channel with data output through the second channel and detect a defect of the first channel and the second channel.

13. The test system of claim 12, wherein the semiconductor device includes:
    a multipurpose register for storing the test data; and
    a DBI calculator for generating the test DBI flag signal based on the test data input from the multipurpose register through global transmission lines and a test DBI data, which is the test data inverted according to the test DBI flag signal, according to the test data.

14. The test system of claim 12, wherein the semiconductor device outputs, through the second channel, the test data during a first test mode and the test DB1 flag signal during a second test mode.

15. The test system of claim 14, wherein the semiconductor device further includes:
    a control signal generation unit for generating a control signal for controlling the first and second test mode; and
    a multiplexer for selectively outputting the test data or the test DBI signal to the second channel in response to the control signal.

* * * * *